United States Patent
Miller et al.

(10) Patent No.: US 11,293,462 B2
(45) Date of Patent: Apr. 5, 2022

(54) PILOT CLOSE VENT VALVE

(71) Applicant: National Oilwell Varco, L.P., Houston, TX (US)

(72) Inventors: Travis James Miller, Cypress, TX (US); Frank Benjamin Springett, Spring, TX (US); James William Weir, Cypress, TX (US); James Landrith, Humble, TX (US)

(73) Assignee: NATIONAL OILWELL VARCO, L.P.

( * ) Notice: Subject to any disclaimer, the term of this patent is extended or adjusted under 35 U.S.C. 154(b) by 831 days.

(21) Appl. No.: 16/076,236

(22) PCT Filed: Feb. 8, 2017

(86) PCT No.: PCT/US2017/016956
§ 371 (c)(1),
(2) Date: Aug. 7, 2018

(87) PCT Pub. No.: WO2017/139343
PCT Pub. Date: Aug. 17, 2017

(65) Prior Publication Data
US 2020/0362885 A1    Nov. 19, 2020

Related U.S. Application Data

(60) Provisional application No. 62/293,020, filed on Feb. 9, 2016.

(51) Int. Cl.
*F15B 13/02* (2006.01)
*F15B 13/042* (2006.01)
(Continued)

(52) U.S. Cl.
CPC ........ *F15B 13/042* (2013.01); *E21B 33/0355* (2013.01); *F15B 11/10* (2013.01); (Continued)

(58) Field of Classification Search
CPC ...... F15B 13/028; F15B 13/042; F15B 11/10; F16K 11/04; F16K 11/044; F16K 31/122;
(Continued)

(56) References Cited

U.S. PATENT DOCUMENTS 3,460,614 A * 8/1969 Burgess .............. E21B 33/0355
166/335
3,701,549 A * 10/1972 Koomey ................ F16L 37/56
285/24
(Continued)

FOREIGN PATENT DOCUMENTS

CN        103174850        9/2015

OTHER PUBLICATIONS

International Search Report and Written Opinion for counterpart PCT application PCT/US2017/016956 dated Apr. 20, 2017; 24 pages.

*Primary Examiner* — Craig J Price
(74) *Attorney, Agent, or Firm* — Jonathan Pierce; Pierre Campanac; Porter Hedges LLP

(57) ABSTRACT

A valve for use in a hydraulic circuit to drive a piston is fluidly connected to a first actuating chamber of the hydraulic piston. The valve is piloted to close when the first chamber is pressurized. The valve vents the fluid in the first actuating chamber when the first chamber is not pressurized. The valve permits several fluid supplies connected to the chamber via check valves to be used to drive the piston. The hydraulic piston and hydraulic circuit may be implemented in a blowout preventer operating in a subsea environment to ensure safe drilling of deepwater wells.

20 Claims, 3 Drawing Sheets

(51) Int. Cl.
*E21B 33/035* (2006.01)
*F15B 11/10* (2006.01)
*F16K 11/04* (2006.01)
*F16K 11/044* (2006.01)
*F16K 31/122* (2006.01)

(52) U.S. Cl.
CPC ............ *F15B 13/028* (2013.01); *F16K 11/04* (2013.01); *F16K 11/044* (2013.01); *F16K 31/122* (2013.01); *Y10T 137/0497* (2015.04); *Y10T 137/2564* (2015.04)

(58) Field of Classification Search
CPC .... F16K 31/1221; F16K 31/163; F16K 11/02; F16K 11/0716; E21B 33/0355; Y10T 137/2564; Y10T 137/2567; Y10T 137/2569; Y10T 137/8663; Y10T 137/86702; Y10T 137/2524; Y10T 137/0497
USPC .................................................. 137/109–114
See application file for complete search history.

(56) References Cited

U.S. PATENT DOCUMENTS

| | | | |
|---|---|---|---|
| 4,457,489 A | 7/1984 | Gilmore | |
| 7,527,070 B2* | 5/2009 | Brennan, III | E21B 49/081 137/270 |
| 8,397,742 B2* | 3/2013 | Thrash | F16K 11/07 137/112 |
| 8,561,630 B2* | 10/2013 | Hu | F16K 11/0716 137/113 |
| 9,359,892 B2* | 6/2016 | Tao | E21B 34/10 |
| 10,677,364 B2* | 6/2020 | Wang | F16K 11/044 |
| 2011/0061752 A1 | 3/2011 | Hu | |
| 2011/0175009 A1* | 7/2011 | Kristoffersen | F16K 15/063 251/321 |
| 2013/0276899 A1* | 10/2013 | Frank | B60G 17/0523 137/1 |
| 2014/0158228 A1 | 6/2014 | Tao | |
| 2017/0370482 A1* | 12/2017 | Lynch | E21B 33/064 |

\* cited by examiner

PILOT CLOSE VENT VALVE

This application is a U.S. national stage application under 35 U.S.C. § 371 of PCT Application No. PCT/US2017/016956, filed on Feb. 8, 2017, which claims priority to U.S. Provisional Application Ser. No. 62/293,020, filed on Feb. 9, 2016, which is incorporated by reference herein for all purposes.

BACKGROUND

This disclosure relates generally to hydraulic circuits for driving a movable component such as a piston, and more particularly to vent valves for use in such hydraulic circuits. The hydraulic circuits may be implemented, for example, in a blowout preventer operating in a subsea environment to ensure safe drilling of deepwater wells.

Pressurized hydraulic fluid is employed to operate blowout preventers. The fluid acts on pistons to close or open shearing rams or gate valves, to expand sealing elements, or to otherwise actuate components. Moreover, multiple control systems, each having an independently pressurized fluid supply, may be used to drive the same piston. For example, the multiple control systems may be located in different control pods of a blowout preventer and may drive the same piston that is actuating a shearing ram. Usually, only one fluid supply is active at a time.

To ensure proper functioning of the pistons, a backflow path should be provided for fluid returning from the pistons when the pistons are actuated in a reversed direction. Also, it may be important that pressurized fluid is automatically vented from inactive portions of the hydraulic circuits that are driving the pistons.

Thus, there is a continuing need in the art for hydraulic circuits for driving pistons that can be used on blowout preventers operating in a subsea environment. Preferably, the hydraulic circuits permit two or more of the plurality of fluid supplies to be active at the same time and can mitigate the risk of reaching excessive pressure differential in the hydraulic circuit of the blowout preventer during the retrieval of the blowout preventer to the surface.

SUMMARY

In one aspect, a pilot close vent valve comprises a body having a cavity therein, a first seal plate positioned in the cavity, the first seal plate comprising a first opening fluidly connected to a first source port, and a shuttle positioned in the cavity. The shuttle includes a piston head sealing a first chamber in the cavity from a second chamber in the cavity, and a first stem extending from a first face of the piston head into the first chamber. The shuttle reciprocates in the cavity between a first end of stroke position wherein the first stem abuts the first seal plate and covers the first opening in the first seal plate, and a second end of stroke position wherein the first stem is separated from the first seal plate by a gap. The pilot close vent valve further comprises a first vent port fluidly connected to the first chamber. The pilot close vent valve further comprises a first pilot port continuously in pressure communication with the second chamber at any position of the shuttle intermediate between the first and second end of stroke positions.

The pilot close vent valve may further comprise a first cage positioned in the cavity on an opposite side of the first seal plate relative to the piston head. The pilot close vent valve may further comprise a second pilot port in pressure communication with the second chamber. The pilot close vent valve may further comprise a first control ring positioned in the cavity between the piston head of the shuttle and the first cage. The first control ring may reciprocate in the cavity between a first control position wherein the first control ring abuts the piston head, and a second control position wherein the first control ring abuts the first cage. The first control ring may continuously seal the first pilot port from the second pilot port at any position of the first control ring intermediate between the first and second control positions. The pilot close vent valve may further comprise a second seal plate positioned in the cavity opposite the first seal plate relative to the piston head of the shuttle. The second seal plate may comprise a second opening fluidly connected to a second source port. The shuttle may further include a second stem extending from a second face opposite the first face of the piston head into the second chamber. The second stem may abut the second seal plate and cover the second opening in the second seal plate in the second end of stroke position of the shuttle. The pilot close vent valve may further comprise a second vent port fluidly connected to the second chamber. The pilot close vent valve may further comprise a second pilot port continuously in pressure communication with the first chamber at any position of the shuttle intermediate between the first and second end of stroke positions. The pilot close vent valve may further comprise a first cage positioned in the first chamber of the cavity. The first cage may isolate the first vent port and the first source port from the second pilot port. The pilot close vent valve may further comprise a sealing tube positioned in a stem cavity in the first stem of the shuttle. The sealing tube may have a first sealing surface to engage with the first seal plate around the first opening in the first seal plate. The first stem may further comprise a second sealing surface to engage with the first seal plate around the first opening in the first seal plate. The second sealing surface may surround the first sealing surface. The sealing tube may reciprocate within the first stem between an extended position wherein the first sealing surface protrudes from the second sealing surface, and a retracted position wherein the first sealing surface is flush with the second sealing surface.

In another aspect, a hydraulic circuit for controlling a movable component comprises a plurality of fluid supplies, a first pilot line in pressure communication with the plurality of fluid supplies, a first flowline coupling a first function port of the movable component to the plurality of fluid supplies, and a pilot close vent valve. The pilot close vent valve includes a body having a cavity therein, and a first seal plate positioned in the cavity. The first seal plate comprises a first opening fluidly connected to a first source port. The pilot close vent valve further includes a shuttle positioned in the cavity. The shuttle includes a piston head sealing a first chamber in the cavity from a second chamber in the cavity. The shuttle includes a first stem extending from a first face of the piston head into the first chamber. The shuttle reciprocates in the cavity between a first end of stroke position wherein the first stem abuts the first seal plate and covers the first opening in the first seal plate, and a second end of stroke position wherein the first stem is separated from the first seal plate by a gap. The pilot close vent valve further includes a first vent port fluidly connected to the first chamber. The pilot close vent valve further includes a first pilot port continuously in pressure communication with the second chamber at any position of the shuttle intermediate between the first and second end of stroke positions. The first source port of the valve is fluidly connected to the first flowline. The first pilot port of the valve is connected to the first pilot line.

The hydraulic circuit may further comprise a plurality of check valves. Each one of the plurality check valves may be fluidly coupled to a corresponding one of the plurality of fluid supplies. Each one of the plurality check valves may be oriented to prevent fluid backflow toward the corresponding fluid supply. The first flowline may be in fluid communication between the plurality of fluid supplies downstream of the plurality of check valves. The hydraulic circuit may further comprise a shuttle valve coupling the first pilot line to the plurality of fluid supplies upstream of the plurality of check valves. The hydraulic circuit may further comprise another plurality of fluid supplies. The hydraulic circuit may further comprise a second pilot line in pressure communication with the other plurality of fluid supplies. The hydraulic circuit may further comprise a second flowline coupling a second function port of the movable component to the other plurality of fluid supplies. The pilot close vent valve may further include a second seal plate positioned in the cavity opposite the first seal plate relative to the piston head of the shuttle. The second seal plate may comprise a second opening fluidly connected to a second source port. The shuttle may include a second stem extending from a second face opposite the first face of the piston head into the second chamber. The second stem may abut the second seal plate and cover the second opening in the second seal plate in the second end of stroke position of the shuttle. The pilot close vent valve may further include a second vent port fluidly connected to the second chamber. The pilot close vent valve may further include a second pilot port continuously in pressure communication with the first chamber at any position of the shuttle intermediate between the first and second end of stroke positions. The pilot close vent valve may further include a first cage positioned in the first chamber of the cavity. The first cage may isolate the first vent port and the first source port from the second pilot port. The second source port of the pilot close vent valve may be fluidly connected to the second flowline. The second pilot port of the pilot close vent valve may be connected to the second pilot line.

In still another aspect, a method of controlling a movable component comprises providing a pilot close vent valve. The pilot close vent valve includes a body having a cavity therein. The pilot close vent valve further includes a first seal plate positioned in the cavity. The first seal plate comprises a first opening fluidly connected to a first source port. The pilot close vent valve further includes a shuttle positioned in the cavity. The shuttle includes a piston head sealing a first chamber in the cavity from a second chamber in the cavity. The shuttle further includes a first stem extending from a first face of the piston head into the first chamber. The pilot close vent valve further includes a first vent port fluidly connected to the first chamber. The pilot close vent valve further includes a first pilot port in pressure communication with the second chamber. The method further comprises connecting a first function port of the movable component, a plurality of fluid supplies, and the first source port with a first flowline. The method further comprises coupling the first pilot port to the plurality of fluid supplies. The method further comprises displacing the shuttle in the cavity to a first end of stroke position wherein the first stem abuts the first seal plate and covers the first opening in the first seal plate by applying pressure from at least one of the plurality of fluid supplies to the first pilot port. The method further comprises displacing the shuttle in the cavity to a second position wherein the first stem is separated from the first seal plate by a gap. The method further comprises discharging backflow from the first function port through the first vent port.

The method may further comprise releasing trapped pressure in the first flowline upon the plurality of fluid supplies not generating pressurized flow. The method may further comprise preventing fluid backflow from the first flowline toward the plurality of fluid supplies by using a plurality of check valves. Coupling the first pilot port to the plurality of fluid supplies may be performed through a series of shuttle valves. The method may further comprise providing a sealing tube positioned in a stem cavity in the first stem of the shuttle. The sealing tube may have a first sealing surface. The method may further comprise engaging the first sealing surface with the first seal plate around the first opening in the first seal plate. The method may further comprise engaging a second sealing surface of the first stem with the first seal plate around the first opening in the first seal plate. The method may further comprise reciprocating the sealing tube within the first stem between an extended position wherein the first sealing surface protrudes from the second sealing surface, and a retracted position wherein the first sealing surface is flush with the second sealing surface.

BRIEF DESCRIPTION OF THE DRAWINGS

For a more detailed description of the embodiments of the present disclosure, reference will now be made to the accompanying drawings, wherein.

DESCRIPTION

Figure 1:
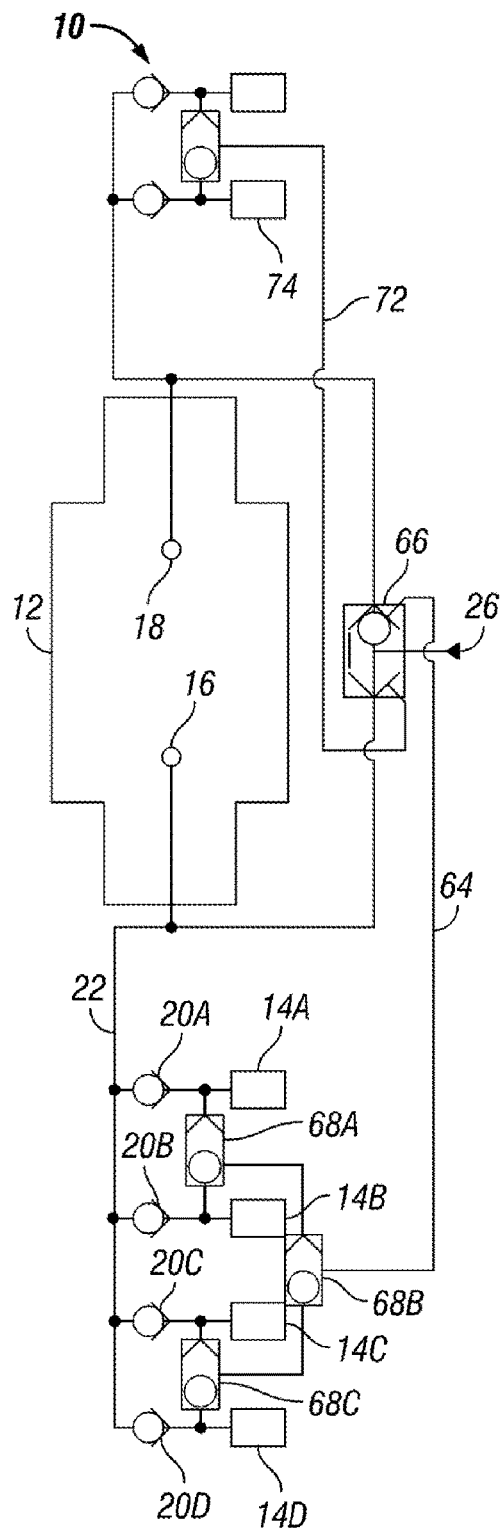
FIG. 1 is a schematic of a hydraulic circuit comprising a pilot close vent valve.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

As used herein, two elements are said to be "fluidly coupled" or "in fluid communication" when a flowpath is provided between the two elements. For example, significant volumes of hydraulic fluid may be transported from one element to the other via the flowpath. However, fluid pressure may or may not be transmitted between the two elements, depending on pressure drops along the flowpath. In contrast, two elements are said to be in "pressure communication" when pressure applied to the hydraulic fluid in one element is transmitted to the other element without necessarily transporting significant volumes of hydraulic fluid between the two elements.

Figure 3:
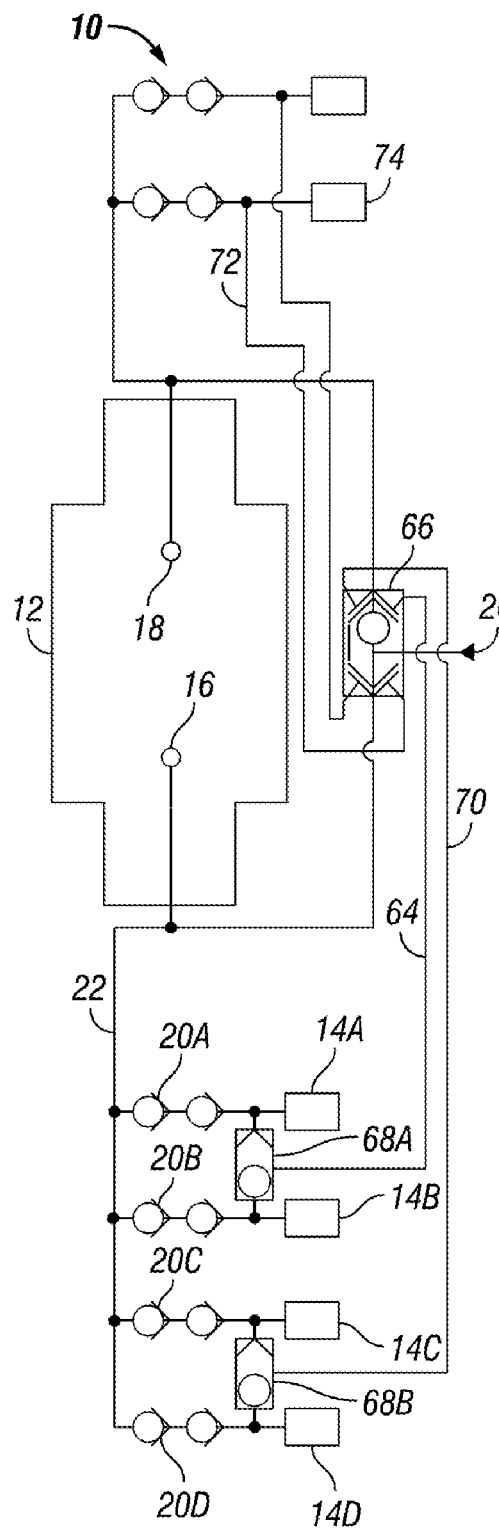
FIG. 3 is a schematic view of another hydraulic circuit comprising a pilot close vent valve.

FIGS. 1 and 3 are schematics showing examples of hydraulic circuits 10 for controlling a component 12 of a blowout preventer using one or more of a plurality of fluid supplies 14a-14d. The component 12 may be a shearing ram, a gate valve, a sealing element, or another hydraulically actuated component. The hydraulic circuits 10 comprise a first function port 16 and a second function port 18 fluidly coupled to, or in fluid communication with, the component 12. For example, the first function port 16 and the second function port 18 may be fluidly coupled to piston chambers of component 12. Pressurized hydraulic fluid flowing into the first function port 16 actuates the component 12 in a first direction, for example, to close the blowout preventer, and to expel hydraulic fluid stored in a chamber of component 12 through the second function port 18. Conversely, pressurized hydraulic fluid flowing into the second function port 18 actuates the component 12 in a second, reversed direction, for example, to open the blowout preventer, and to expel hydraulic fluid stored in another chamber of component 12 through the first function port 16. The hydraulic circuits 10 further comprise a plurality of check valves 20a-20d. Each one of the plurality check valves 20a-20d is coupled to a corresponding one of the plurality of fluid supplies 14a-14d and oriented to prevent fluid backflow towards the corresponding fluid supply.

The hydraulic circuits 10 shown in FIGS. 1 and 3 comprise a flowline 22 fluidly coupling the first function port 16 and the plurality of check valves 20a-20d. The hydraulic circuits 10 further comprise a first pilot line 64 that is in pressure communication with at least one of the plurality of fluid supplies 14a, 14b. The hydraulic circuits 10 further comprise a pilot close vent valve 66 fluidly coupled between the flowline 22 and a vent port 26, and in pressure communication with the fluid in a first pilot line 64. The pilot close vent valve 66 has a first configuration, wherein the pilot close vent valve 66 prevents flow between the flowline 22 and the vent port 26, and a second configuration, wherein the pilot close vent valve 66 allows flow between the flowline 22 and the vent port 26. The pilot close vent valve 66 is shifted in the first configuration upon applying pressure to the fluid in the first pilot line 64. The same pilot close vent valve 66 is used to vent pressure trapped in the flowline 22 or trapped in a flowline similar to flowline 22 on the side of the second function port 18. Thus, the pilot close vent valve 66 may be fluidly coupled to both flowlines fluidly coupled to function ports 16 and 18.

In the example of FIG. 1, the first pilot line 64 is in pressure communication with the plurality of fluid supplies 14a-14d through a series of shuttle valves 68a-68c. However, all or some of these shuttle valves may be replaced by additional pilot lines to close the pilot close vent valve 66. For example in FIG. 3, the hydraulic circuit 10 further comprises a second pilot line 70 having fluid therein. The first pilot line 64 is in pressure communication with the fluid supplies 14a and 14b. The second pilot line 70 is in pressure communication with the fluid supplies 14c and 14d. The pilot close vent valve 66 is also shifted to the first configuration upon applying pressure to the fluid in the second pilot line 70. As illustrated, the pilot close vent valve 66 is a shuttle valve having multiple pilot inputs. While the first pilot line 64 is shown preferably in pressure communication with the fluid supplies 14a, 14b at a point upstream of the plurality of check valves 20a, 20b, it should be noted the first pilot line 64 may instead be in pressure communication with the first function port 16 and coupled to the flowline 22 at a point downstream of the plurality of check valves 20a-20b. In these cases, it may become necessary to provide a third pilot line 72 having fluid therein in pressure communication with another fluid supply 74. The pilot close vent valve 66 may be shifted to the second configuration upon applying pressure to the fluid in the third pilot line 72, for example via the other fluid supply 74.

In operation, one or more of the plurality of fluid supplies 14a-14d may be used to control the component 12 of the blowout preventer. One or more of the plurality of fluid supplies 14a-14d may generate a flow of pressurized hydraulic fluid into the first function port 16 through one or more of the plurality of check valves 20a-20d. The plurality of check valves 20a-20d ensure that the flow of hydraulic fluid from one of the fluid supplies 14a-14d is not vented into another of the fluid supplies 14a-14d that is not activated. Thus, the flow of pressurized hydraulic fluid is routed to the first function port 16. Also, when none of the plurality of fluid supplies 14a-14d generate flow, and/or when the pressure at the other fluid supply 74 is transmitted to the fluid in the third pilot line 72, a vent port 26 in the pilot close vent valve 66 opens. Fluid in the flowline 22, for example, backflow from the component 12, may be discharged through the vent port 26. Thus hydraulic fluid may not remain trapped at high-pressure levels in the flowline 22.

It should be noted that for the sake of simplicity only portions of the hydraulic circuits 10 for controlling the component 12 via the function port 16 have been described in FIGS. 1 and 3. However, persons skilled in the art, given the benefit of the present disclosure, will appreciate that the hydraulic circuits 10 may also include additional elements that provide complementary functionality to the control of component 12 via the function port 18.

Figure 2:
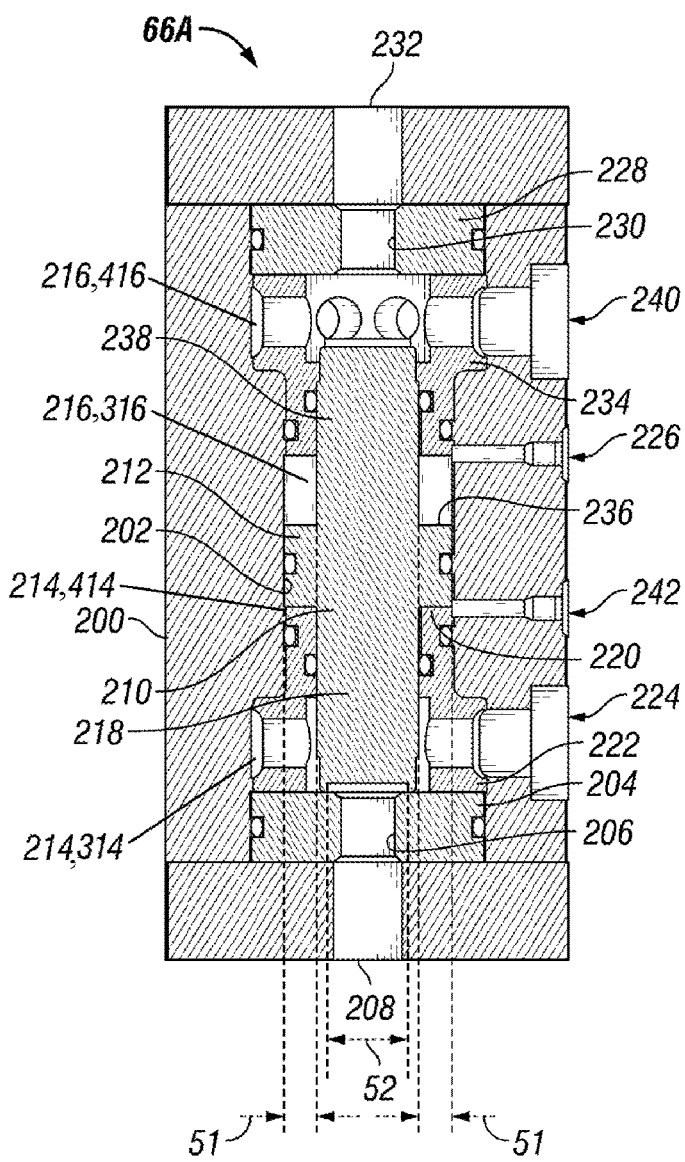
FIG. 2 is a sectional view of an embodiment of the pilot close vent valve shown in FIG. 1.

FIG. 2 is a sectional view of an embodiment 66a of the pilot close vent valve 66 shown in FIG. 1. The embodiment 66a comprises a body 200 having a cavity 202 therein. For example, the body may comprise an elongated middle portion having a cylindrical cavity enclosed between two caps. A first seal plate 204 is positioned in the cavity 202 and serves as the valve seat. For example, the first seal plate may be made of plastic. The first seal plate 204 comprises an opening 206 fluidly connected to a first source port 208. The first source port 208 is in turn fluidly connected to a piston chamber of the blowout preventer component (e.g., via the flowline 22 and the function port 16 in FIG. 1). A shuttle 210 is positioned in the cavity 202. The shuttle 210 includes a piston head 212 sealing against a wall of the cavity 202 and having first and second opposite faces 220 and 236, respectively. The piston head 212 isolates a first chamber 214 in the cavity 202 from a second chamber 216. The shuttle 210 further includes a first stem 218 extending from the first face 220 of the piston head 212 into the first chamber 214. The piston head 212 may be integral with the first stem 218. The shuttle 210 is guided into reciprocating movement within the cavity 202 by the piston head 212 and by first or second cages 222 and 234, positioned respectively in the first and second chambers 214 and 216. As such, the shuttle 210 can reciprocate in the cavity 202 between a first end of stroke position (shown in FIG. 2), wherein the first stem 218 abuts the first seal plate 204 and covers the opening 206 in the first seal plate 204, and a second end of stroke position wherein the first stem 218 is separated from the first seal plate 204 by a gap. Further, the first cage 222 isolates a first portion 314 of the first chamber 214 from a second portion 414 of the first chamber 214. A first vent port 224 (e.g., the vent port 26 in FIG. 1) of the embodiment 66a is fluidly connected to the first portion 314 of the first chamber 214. Still further, the second cage 234 isolates a first portion 316 of the second chamber 216 from a second portion 416 of the second chamber 216. A first pilot port 226 of the embodiment 66a is continuously in pressure communication with the first portion 316 of the second chamber 216 at any position of the shuttle 210 intermediate between the first and second end of stroke positions. The first pilot port 226 is preferably in pressure communication with the same fluid supply or supplies as the first source port 208 and as the piston chamber of the blowout preventer component.

In operation, a fluid supply (e.g., one or more of the fluid supplies 14a-14d in FIG. 1) may intermittently generate a flow of pressurized fluid toward the piston chamber of the component of the blowout preventer (e.g., via the function port 16 in FIG. 1). When the fluid supply generates pressurized flow, the fluid supply pressure is communicated to the first portion 316 of the second chamber 216 via the first pilot port 226. The pressure is applied to a surface 51 of the second face 236 of the piston head 212 and generates a force directed to move the shuttle 210 toward the first seal plate 204. At the same time, pressurized fluid may flow from the first source port 208 through the first portion 314 of the first chamber 214 and into the first vent port 224. The pressure in the first portion 314 of the first chamber 214, usually lower than or at most equal to the fluid supply pressure, is applied to a surface 52 of the first stem 218 and generates a force directed to move the shuttle 210 away from the first seal plate 204. Closure of the first source port 208 may be insured by sizing the surface 52 smaller than the surface 51 so that the force generated by the pressure applied on larger surface 51 is greater than the force generated by the pressure applied on smaller surface 52. Thus, the first source port 208 is sealed from the first vent port 224. When the fluid supply does not generate pressurized flow, the fluid supply pressure communicated to the first portion 316 of the second chamber 216 via the first pilot port 226 drops to a pressure level close to the vent pressure. If pressure remains trapped in a flowline fluidly connected to the first source port 208 (e.g., in the flowline 22, between the function port 16 and the plurality of check valves 20a-20d in FIG. 1), this pressure applied to the surface 51 generates a force that may be sufficient to move the shuttle 210 away from the first seal plate 204 and permit fluid communication between the first source port 208 and the first vent port 224, thus releasing the pressure in the flowline fluidly connected to the first source port 208.

As illustrated in FIG. 2, the embodiment 66a of the pilot close vent valve 66 may be symmetrical and may provide a vent port for both piston chambers of the blowout preventer component. As such, a second seal plate 228 may be positioned in the cavity 202 opposite the first seal plate 204 relative to the piston head 212 of the shuttle 210. The second seal plate 228 also comprises an opening 230. The opening 230 is fluidly connected to a second source port 232 which is, in turn, fluidly connected to another piston chamber of the blowout preventer component (e.g., via the function port 18 in FIG. 1). A second stem 238 may extend from the second face 236 of the piston head 212 into the second chamber 216. The piston head 212 may be integral with the second stem 238. The piston head 212 and both the first and second stems 218 and 238 may form a unitary body. The second stem 238 may be sized identically as the first stem 218; however, the second stem may have a smaller or larger cross area than the first stem in other embodiments. Sizing the second stem 238 identically as the first stem 218 may be advantageous in cases where the first function port 16 and the second function port 18 should operate symmetrically. In the second end of stroke position of the shuttle 210, the second stem 238 abuts the second seal plate 228, covers the opening 230 in the second seal plate 228, and seals the second source port 232 from a second vent port 240 fluidly connected to the second chamber 216. The second cage 234 provides fluid isolation between any of the second portion 416 of the second chamber 216, the second vent port 240 or the second source port 232, and any of the first portion 316 of the second chamber 216, or the first pilot port 226. Further, a second pilot port 242 is continuously in pressure communication with the second portion 414 of the first chamber 214 at any position of the shuttle 210 intermediate between the first and second end of stroke positions. The first cage 222 provides fluid isolation between any of the first portion 314 of the first chamber 214, the first vent port 224 or the first source port 208., and any of the second portion 414 of the first chamber 214, or the second pilot port 242.

Figure 4:
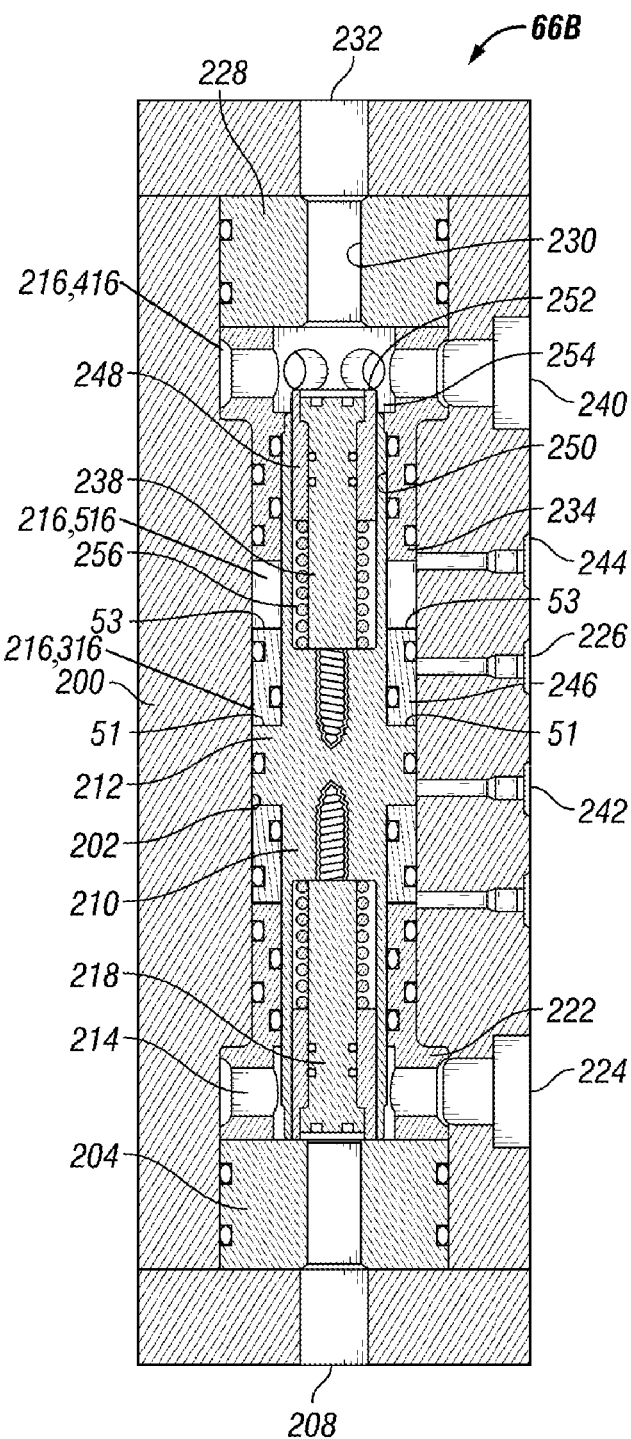
FIG. 4 is a sectional view of an embodiment of the pilot close vent valve shown in FIG. 3.

FIG. 4 is a sectional view of an embodiment 66b of the pilot close vent valve 66 shown in FIG. 3. The embodiment 66b may include several elements or features that are similar to the embodiment 66a. In addition, the embodiment 66b includes a third pilot port 244 in pressure communication with a third portion 516 of the second chamber 216 and a first control ring 246 positioned in the cavity 202 between the piston head 212 of the shuttle 210 and the second cage 234. The first control ring 246 reciprocates in the cavity between a first control position (as shown in FIG. 4) wherein the first control ring 246 abuts the piston head 212 and a second control position wherein the first control ring 246 abuts the second cage 234. The first control ring 246 continuously seals the first portion 316 of the second chamber 216 or the first pilot port 226, from the third portion 516 of the second chamber 216 or the third pilot port 244 at any position of the first control ring 246 intermediate between the first and second control positions.

In operation, a plurality of fluid supplies (e.g., one of the fluid supplies 14a-14b and one of the fluid supplies 14c-14d in FIG. 3) may intermittently generate a flow of pressurized fluid toward the piston chamber of the component of the blowout preventer (e.g., via the function port 16 in FIG. 1). When any of the plurality of fluid supplies generates pressurized flow, its pressure is communicated to the first portion 316 of the second chamber 216 via either the first pilot port 226 or to the third portion 516 of the second chamber 216 via the third pilot port 244. This pressure may be applied to a surface 53 of the first control ring 246, and generate a force directed to move the first control ring 246 toward the first seal plate 204. This force is transmitted to the piston head 212. Or this pressure may be applied to the surface 51 of the piston head 212. In any case, this force tends to move the shuttle 210 toward the first seal plate 204 as previously described, wherein the shuttle 210 seals the first source port 208 from the first vent port 224. Thus, the embodiment 66b permits several independent pilot lines to control closure of the first source port 208.

Figure 5:
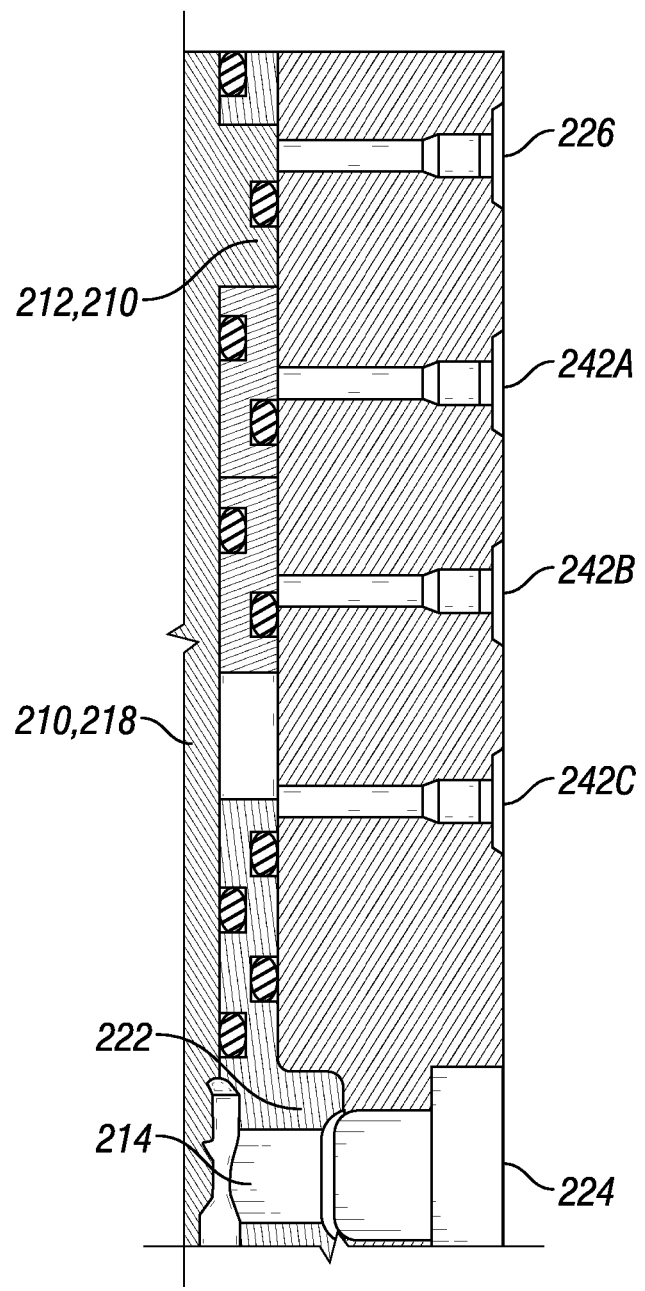
FIG. 5 is a sectional view of a portion of another embodiment of a pilot close vent valve.

It should be noted that for the sake of simplicity only portions of the embodiment 66b have been described. However, persons skilled in the art, given the benefit of the present disclosure, will appreciate that the embodiment 66b may also include additional elements that provide complementary pilot-to-close functionality to second source port 232. Also, it should be noted that while only first and third pilot ports 226 and 244 separated by the first control ring 246 are shown in FIG. 4, more pilot lines and/or control rings may be implemented in other embodiments, for example as shown in the partial sectional view of FIG. 5 wherein three pilot lines 242a-242c are illustrated.

The embodiment 66b optionally comprises a sealing tube 248 positioned in a stem cavity 250 in the second stem 238 of the shuttle 210. The sealing tube 248 has a first sealing surface 252 to engage with the second seal plate 228 around the opening 230 in the second seal plate. The second stem 238 comprises a second sealing surface 254 to engage with the second seal plate 228 around the opening 230 in the second seal plate too. The second sealing surface 254 may surround the first sealing surface 252. The sealing tube 248 reciprocates within the second stem 238 between an extended position (shown in FIG. 4) wherein the first sealing surface 252 protrudes from the second sealing surface 254, and a retracted position wherein the first sealing surface 252 is flush with the second sealing surface 254. For example, the sealing tube 248 may be biased toward the first position using a spring 256. Upon contact with the second seal plate 228, the spring 256 may be compressed, permitting retraction of the sealing tube 248 within the stem cavity 250. As such, the optional sealing tube 248 may provide a redundant seal between the second source port 232 and the second vent port 240. Similar sealing tube and redundant sealing surfaces may also be implemented in the first stem 218 to provide a redundant seal between the first source port 208 and the first vent port 224.

While the disclosure is susceptible to various modifications and alternative forms, specific embodiments thereof are shown by way of example in the drawings and description. It should be understood, however, that the drawings and detailed description thereto are not intended to limit the disclosure to the particular form disclosed, but on the contrary, the intention is to cover all modifications, equivalents, and alternatives falling within the scope of the claims.

What is claimed is:

1. A valve, comprising:
   a body having a cavity therein;
   a first seal plate positioned in the cavity, the first seal plate comprising a first opening fluidly connected to a first source port;
   a shuttle positioned in the cavity, the shuttle including:
      a piston head for sealing a first chamber in the cavity from a second chamber in the cavity, and
      a first stem extended from a first face of the piston head into the first chamber, the shuttle being reciprocable in the cavity between a first end of stroke position wherein the first stem abuts the first seal plate and closes the first opening in the first seal plate, and a second end of stroke position wherein the first stem is separated from the first seal plate by a gap and a flowpath is established from the first source port through a first portion of the first chamber and into a first vent port;
   wherein the first vent port is fluidly connected to the first portion of the first chamber;
   a first pilot port; and
   a pressure communication between the first pilot port and a first portion of the second chamber configured such that the first pilot port remains continuously in pressure communication with the first portion of the second chamber at any position of the shuttle intermediate between the first and second end of stroke positions.

2. The valve of claim 1, further comprising:
   a first cage positioned in the cavity on an opposite side of the first seal plate relative to the piston head;
   a third pilot port in pressure communication with a third portion of the second chamber; and
   a first control ring positioned in the cavity between the piston head of the shuttle and the first cage, wherein the first control ring is reciprocable in the cavity between a first control position wherein the first control ring abuts the piston head, and a second control position wherein the first control ring abuts the first cage,
   wherein the first control ring provides a seal between the first pilot port and the third pilot port, the seal isolating the first portion of the second chamber and the third portion of the second chamber.

3. The valve of claim 1, further comprising:
   a second seal plate positioned in the cavity opposite the first seal plate relative to the piston head of the shuttle, the second seal plate comprising a second opening fluidly connected to a second source port;
   the shuttle further including:
      a second stem extended from a second face opposite the first face of the piston head into the second chamber, wherein the second stem abuts the second seal plate and closes the second opening in the second seal plate in the second end of stroke position of the shuttle;
   a second vent port fluidly connected to a second portion of the second chamber;
   a second pilot port continuously in pressure communication with a second portion of the first chamber at any position of the shuttle intermediate between the first and second end of stroke positions; and
   a first cage positioned in the first chamber of the cavity, the first cage isolating the first vent port and the first source port from the second pilot port, the first cage further isolating the first portion of the first chamber from the second portion of the first chamber.

4. The valve of claim 1, further comprising:
- a sealing tube positioned in a stem cavity in the first stem of the shuttle, the sealing tube having a first sealing surface adapted to engage with the first seal plate around the first opening in the first seal plate; and
- the first stem comprising a second sealing surface adapted to engage with the first seal plate around the first opening in the first seal plate,
- wherein the second sealing surface surrounds the first sealing surface.

5. The valve of claim 4 wherein the sealing tube reciprocates within the first stem between an extended position wherein the first sealing surface protrudes from the second sealing surface, and a retracted position wherein the first sealing surface is flush with the second sealing surface.

6. A hydraulic circuit for controlling a movable component, comprising:
- a plurality of fluid supplies;
- a first pilot line in pressure communication with the plurality of fluid supplies;
- a first flowline coupled to a first function port of the movable component and to the plurality of fluid supplies; and
- the valve of claim 1;
- wherein the first source port of the valve is fluidly connected to the first flowline, and wherein the first pilot port of the valve is connected to the first pilot line.

7. The hydraulic circuit of claim 6, wherein the valve further comprises:
- a first cage positioned in the cavity on an opposite side of the first seal plate relative to the piston head;
- a third pilot port in pressure communication with a third portion of the second chamber; and
- a first control ring positioned in the cavity between the piston head of the shuttle and the first cage, wherein the first control ring is reciprocable in the cavity between a first control position wherein the first control ring abuts the piston head, and a second control position wherein the first control ring abuts the first cage,
- wherein the first control ring provides a seal between the first pilot port and the third pilot port, the seal isolating the first portion of the second chamber and the third portion of the second chamber.

8. The hydraulic circuit of claim 6, wherein the valve further comprises:
- a sealing tube positioned in a stem cavity in the first stem of the shuttle, the sealing tube having a first sealing surface adapted to engage with the first seal plate around the first opening in the first seal plate; and
- the first stem comprising a second sealing surface adapted to engage with the first seal plate around the first opening in the first seal plate,
- wherein the second sealing surface surrounds the first sealing surface.

9. The hydraulic circuit of claim 8, wherein the sealing tube reciprocates within the first stem between an extended position wherein the first sealing surface protrudes from the second sealing surface, and a retracted position wherein the first sealing surface is flush with the second sealing surface.

10. The hydraulic circuit of claim 6, further comprising a plurality of check valves, each one of the plurality of check valves fluidly coupled to a corresponding one of the plurality of fluid supplies and oriented to prevent fluid backflow toward the corresponding one of the plurality of fluid supplies, wherein the first flowline is in fluid communication between the plurality of fluid supplies downstream of the plurality of check valves.

11. The hydraulic circuit of claim 10, further comprising a shuttle valve coupled to the first pilot line and to the plurality of fluid supplies upstream of the plurality of check valves.

12. The hydraulic circuit of claim 7, further comprising a plurality of check valves, each one of the plurality of check valves fluidly coupled to a corresponding one of the plurality of fluid supplies and oriented to prevent fluid backflow toward the corresponding one of the plurality of fluid supplies, wherein the first flowline is in fluid communication between the plurality of fluid supplies downstream of the plurality of check valves.

13. The hydraulic circuit of claim 12, further comprising a shuttle valve coupled to the first pilot line and to the plurality of fluid supplies upstream of the plurality of check valves.

14. The hydraulic circuit of claim 6, further comprising:
- another plurality of fluid supplies;
- a second pilot line in pressure communication with the another plurality of fluid supplies; and
- a second flowline coupling a second function port of the movable component to the another plurality of fluid supplies,
- wherein the valve further includes:
  - a second seal plate positioned in the cavity opposite the first seal plate relative to the piston head of the shuttle, the second seal plate comprising a second opening fluidly connected to a second source port,
  - the shuttle including a second stem extended from a second face opposite the first face of the piston head into the second chamber, wherein the second stem abuts the second seal plate and closes the second opening in the second seal plate in the second end of stroke position of the shuttle;
  - a second vent port fluidly connected to a second portion of the second chamber;
  - a second pilot port continuously in pressure communication with a second portion of the first chamber at any position of the shuttle intermediate between the first and second end of stroke positions; and
  - a first cage positioned in the first chamber of the cavity, the first cage isolating the first vent port and the first source port from the second pilot port, the first cage further isolating the first portion of the first chamber from the second portion of the first chamber,
- wherein the second source port of the valve is fluidly connected to the second flowline, and
- wherein the second pilot port of the valve is connected to the second pilot line.

15. A method of controlling a movable component, comprising:
- providing a valve, the valve including a body having a cavity therein, a first seal plate positioned in the cavity, the first seal plate comprising a first opening fluidly connected to a first source port, a shuttle positioned in the cavity, the shuttle including a piston head sealing a first chamber in the cavity from a second chamber in the cavity, a first stem extending from a first face of the piston head into the first chamber; a first vent port fluidly connected to a portion of the first chamber, and a first pilot port in pressure communication with a portion of the second chamber;
- connecting a first function port of the movable component, a plurality of fluid supplies, and the first source port with a first flowline;
- coupling the first pilot port to the plurality of fluid supplies;

displacing the shuttle in the cavity to a first end of stroke position wherein the first stem abuts the first seal plate and closes the first opening in the first seal plate by applying pressure from at least one of the plurality of fluid supplies to the first pilot port;

displacing the shuttle in the cavity to a second position wherein the first stem is separated from the first seal plate by a gap and a flowpath is established from the first source port through the portion of the first chamber and into the first vent port; and discharging backflow from the first function port through the first vent port.

16. The method of claim 15 further comprising releasing trapped pressure in the first flowline upon the plurality of fluid supplies not generating pressurized flow.

17. The method of claim 15 further comprising preventing fluid backflow from the first flowline toward the plurality of fluid supplies by using a plurality of check valves.

18. The method of claim 15 wherein coupling the first pilot port to the plurality of fluid supplies is performed through a series of shuttle valves.

19. The method of claim 15 further comprising:

providing a sealing tube positioned in a stem cavity in the first stem of the shuttle, the sealing tube having a first sealing surface;

engaging the first sealing surface with the first seal plate around the first opening in the first seal plate; and engaging a second sealing surface of the first stem with the first seal plate around the first opening in the first seal plate.

20. The method of claim 19 further comprising reciprocating the sealing tube within the first stem between an extended position wherein the first sealing surface protrudes from the second sealing surface, and a retracted position wherein the first sealing surface is flush with the second sealing surface.

\* \* \* \* \*